United States Patent [19]

Vaughn, Jr.

[11] Patent Number: 4,486,503
[45] Date of Patent: Dec. 4, 1984

[54] SILICONE RESIN COATING COMPOSITION

[75] Inventor: Howard A. Vaughn, Jr., Schenectady, N.Y.

[73] Assignee: General Electric Company, Waterford, N.Y.

[21] Appl. No.: 415,844

[22] Filed: Sep. 8, 1982

Related U.S. Application Data

[60] Continuation of Ser. No. 120,868, Feb. 12, 1980, abandoned, which is a division of Ser. No. 964,910, Nov. 30, 1978, abandoned.

[51] Int. Cl.$^3$ .............................................. B32B 27/36
[52] U.S. Cl. .................................... 428/412; 428/447; 428/448; 428/450; 524/493; 524/588; 524/837
[58] Field of Search ................. 524/493, 837, 588; 428/412, 447, 448, 450

[56] References Cited

U.S. PATENT DOCUMENTS

| | | | |
|---|---|---|---|
| 3,629,165 | 12/1971 | Holdstock | 260/2.5 AH |
| 3,708,225 | 1/1973 | Misch et al. | 351/160 |
| 3,976,497 | 8/1976 | Clark | 106/287 SE |
| 3,986,997 | 10/1976 | Clark | 260/29.2 M |
| 3,989,672 | 11/1976 | Vestergaard | 260/47 XA |
| 4,177,315 | 12/1979 | Ubersax | 428/336 |
| 4,277,287 | 7/1981 | Frye | 106/287.12 |

*Primary Examiner*—Allan Lieberman
*Attorney, Agent, or Firm*—Hedman, Gibson, Costigan & Hoare

[57] ABSTRACT

Silicone resin coating compositions, which when applied to a solid substrate provide an abrasion resistant coating thereto, are disclosed herein. The coating compositions have a basic pH in the range of from 7.1–7.8 and are prepared by hydrolyzing an alkyltrialkoxysilane or aryltrialkoxysilane in an aqueous colloidal silica dispersion.

12 Claims, No Drawings

SILICONE RESIN COATING COMPOSITION

This is a continuation of application Ser. No. 120,868 filed Feb. 12, 1980, now abandoned, which is a divisional of application Ser. No. 964,910, filed Nov. 30, 1978 now abandoned.

BACKGROUND OF THE INVENTION

This invention relates to a protective coating composition. More particularly, it relates to a silicone resin coating composition which, when applied to a substrate, forms a protective, abrasion-resistant coating thereon.

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eye glasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering and lighter than glass, a serious drawback lies in the ease with which these plastics mar and scratch, due to everyday contact with abrasives, such as dust, cleaning equipment and/or ordinary weathering. Continuous scratching and marring results in impaired visibility and poor aesthetics, and oftentimes requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature, good dimensional stability, as well as being self-extinguishing, and is easily fabricated.

Attempts have been made to improve the abrasion resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225, 3,986,997 and 3,976,497, for example, describe such compositions.

While these afore-mentioned coating formulations have been found acceptable, there still remains room for improvement. For example, the coating compositions of this invention provide coatings having improved resistance to moisture and humidity and ultraviolet light, in comparison with those coatings provided in accordance with U.S. Pat. No. 3,986,997. Moreover, it has been found herein that in direct contrast to the teachings of U.S. Pat. No. 3,986,997, the basic coating compositions of this invention having a pH in the range of from 7.1-7.8, do not immediately gel and provide excellent coatings having good properties on solid substrates.

Protective coatings for metals, bright or dull, are also needed. For example, bright metallized plastics, wherein small amounts of metal are vacuum sputtered or vacuum metallized over the plastic, now popular with the auto industry because of their light weight, need protective layers to prevent scratching and marring of the brilliant surface. Metal wheel covers (hub caps) also require protective coatings for their preservation and lasting beauty.

SUMMARY OF THE INVENTION

Accordingly, it is one object of the present invention to provide a new protective coating resin for solid substrates.

Another object of this invention is to provide a coating resin for solid substrates which, when applied to the substrate, will provide an abrasion-resistant surface thereto.

Still another object of the present invention is to provide a coating composition, especially well suited for providing an abrasion resistant coating surface to transparent substrates.

A further object of this invention is to provide a protective coating resin which is readily applicable to a substrate and which, when applied, provides an improved coating having especially superior resistance to moisture, humidity and ultraviolet light than prior art coatings.

A still further object of the present invention is to provide a coating resin composition also well suitable as a protective coating for metals and metallized surfaces.

These and other objects are accomplished herein by a coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3$-$Si(OH)_3$, said composition containing 10 to 50 weight percent solids, said solids consisting essentially of 10 to 70 weight percent colloidal silica and 30 to 90 weight percent of the partial condensate, said composition having a pH from 7.1 to about 7.8.

DETAILED DESCRIPTION OF THE INVENTION

The coating compositions of this invention are prepared by hydrolyzing a trialkoxysilane or a mixture of trialkoxysilanes of the formula $RSi(OR)_3$, wherein R is alkyl of from 1 to 3 carbons or aryl, such as phenyl, in an aqueous dispersion of colloidal silica.

In the practice of the present invention, suitable aqueous colloidal silica dispersions generally have a particle size of from 5 to 150 millimicrons in diameter. These silica dispersions are well known in the art and commercially available ones include, for example, those sold under the trademarks of Ludox (duPont) and Nalcoag (NALCO Chemical Co.). Such colloidal silicas are available as both acidic and basic hydrosols. For the purpose of this invention, wherein the pH of the coating compositions is on the basic side, basic colloidal silica sols are preferred. However, acidic colloidal silicas, wherein the pH is adjusted to a basic level, are also contemplated. In addition, it has been found that colloidal silicas having a low alkali content (e.g., $Na_2O$) yield a more stable coating composition. Thus, colloidal silicas having an alkali content of less than 0.35% (calculated as $Na_2O$) have been found to be preferable. Moreover, colloidal silicas having average particle size of from 10 to 30 millimicrons are also preferred. A particularly preferred aqueous colloidal silica dispersion for the purpose herein is known as Ludox LS, sold by duPont Company.

In accordance with this invention, the aqueous colloidal silica dispersion is added to a solution of a small amount of alkyltriacetoxysilane in alkyltrialkoxysilane or aryltrialkoxysilane. For the purposes herein, from about 0.07 parts by weight to about 0.1 parts by weight, based on 100 parts by weight of the total composition, of the alkyltriacetoxysilane is used. The temperature of the reaction mixture is maintained at about 20° C. to about 40° C., preferably 20° C. to about 30° C., and most preferably below 25° C. It has been found that in about six to eight hours sufficient trialkoxysilane has hydrolyzed so as to reduce the initial two phase liquid mixture to one liquid phase in which the now treated silica (i.e., treated by its admixture with the alkyltrialkoxysilane or aryltrialkoxysilane) is dispersed. In general, the hydrolysis reaction is allowed to continue for a total of about 24 to 48 hours, depending upon the desired viscosity of the final product. The more time the hydrolysis reaction is permitted to continue, the higher will be the viscosity of the product. After the hydrolysis has been completed to the desired extent, the solids content is adjusted by the addition of alcohol, preferably isobutanol, to the reaction mixture. Other suitable alcohols for the purpose herein include lower aliphatic alcohols such as methanol, ethanol, propanol, isopropanol, n-butyl alcohol and t-butyl alcohol. Mixtures of such alcohols can be used, too. The solvent system should contain from about 20 to 75 weight percent alcohol to ensure solubility of the partial condensate (siloxanol). Optionally, additional water-miscible polar solvents, such as acetone, butyl cellosolve and the like in minor amounts, like no more than 20 weight percent of the cosolvent system can also be used. The solids content of the coating compositions of this invention is generally preferred to be in the range of from about 18 to 25%, most preferably, about 20%, by weight of the total composition. The pH of the resultant coating composition is in the range of from about 7.1 to about 7.8, preferably higher than 7.2. If necessary, dilute base, such as ammonium hydroxide or weak acid, such as acetic acid, can be added to the composition to adjust the final pH to this desired range. At these basic pH's, the compositions are translucent liquids which are stable at room temperature for at least several weeks. When stored at temperatures below about 5° C. (40° F.) the period of stability is increased further.

Additives and other modifying agents, such as thickeners, pigments, dyes, and the like, may be added to the composition at this time. A particularly desirable additive to the coating compositions of this invention has been found to be a small amount of a polysiloxane polyether copolymer. It has been found, and is the subject of another invention disclosed in a copending U.S. application entitled "Improved Silicone Resin Coating Composition" Ser. No. 964,911, now U.S. Pat. No. 4,277,287 to Robert Bruce Frye, that these polysiloxane polyether copolymers prevent the occurrence of undesirable flowmarks and dirtmarks which sometimes occur with the application of the coating composition onto the substrate. A particularly useful polysiloxane polyether copolymer for the purposes herein is known as SF-1066 and is available from the General Electric Company. The preparation, further description and structural formulae for these polysiloxane polyether copolymers are found in U.S. Pat. No. 3,629,165, incorporated by reference herein.

The alkyltriacetoxysilane is used to buffer the basicity of the initial two liquid phase reaction mixture and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic and the like. Alkyltriacetoxysilanes wherein the alkyl group contains from 1 to 6 carbon atoms can be used, alkyl groups having from 1 to 3 carbon atoms being preferred. Methyltriacetoxysilane is most preferred for the purposes herein.

The silanetriols, $RSi(OH)_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which, upon hydrolysis, generate the silanetriol and further liberate the corresponding alcohol. In this way, at least, a portion of the alcohol content present in the final coating composition is provided. Of course, if a mixture of trialkoxysilanes is employed, as provided for hereinabove, a mixture of different silanetriols, as well as different alcohols, is generated. Upon the generation of the silanetriol or mixtures of silanetriols in the basic aqueous medium, condensation of the hydroxyl substituents to form

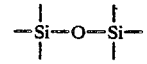

bonding occurs. This condensation takes place over a period of time and is not an exhaustive condensation but rather the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three

units.

The non-volatile solids portion of the coating composition herein is a mixture of colloidal silica and the partial condensate (or siloxanol) of a silanol. The major portion or all of the partial condensate or siloxanol is obtained from the condensation of $CH_3Si(OH)_3$ and, depending upon the input of ingredients to the hydrolysis reaction, minor portions of partial condensate can be obtained, for example, from the condensation of $CH_3Si(OH)_3$ with $C_2H_5Si(OH)_3$ or $C_3H_7Si(OH)_3$; $CH_3Si(OH)_3$ with $C_6H_5Si(OH)_3$, or even mixtures of the foregoing. For optimum results in the cured coating it is preferred to use all methyltrimethoxysilane (thus generating all monomethylsilanetriol) in preparing the coating compositions herein. In the preferred coating compositions herein the partial condensate is present in an amount of from about 55 to 75 weight percent of the total solids in a cosolvent of alcohol and water, the alcohol comprising from about 50% to 95% by weight of the cosolvent.

The coating compositions of this invention will cure on a substrate at temperatures of, for example, 120° C.

without the aid of an added curing catalyst. However, in order to employ more desirable milder curing conditions, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylate catalysts will be generated in situ during the hydrolysis reaction herein.

The amount of curing catalyst can be varied within a wide range, depending upon the desired curing conditions. However, in general, catalyst in the amounts of from about 0.05 to about 0.5 weight percent, preferably about 0.1 weight percent, of the composition can be used. Compositions contain catalysts in these amounts can be cured on a solid substrate in a relatively short time at temperatures in the range of from about 75°–150° C. to provide a transparent abrasion resistant surface coating.

The coating compositions of the present invention can be applied to a variety of solid substrates by conventional methods, such as flowing, spraying or dipping, to form a continuous surface film. Substrates which are especially contemplated herein are transparent, as well as non-transparent, plastics and metals. More particularly, these plastics are synthetic organic polymeric substrates such as acrylic polymers, like poly(methylmethacrylate), polyesters, such as poly(ethylene terephthalate), poly(butylene terephthalate), etc., polyamides, polyimides, acrylonitrile-styrene copolymers, styrene-acrylonitrile-butadiene copolymers, polyvinyl chloride, butyrates, polyethylene and the like. As noted above, the coating compositions of this invention are especially useful as coatings for polycarbonates, such as those polycarbonates known as Lexan ®, sold by General Electric Company. The metal substrates on which the present protective coatings are utilized include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment, including the use of primers, of the substrate, the coatings can be adhered to substantially all solid substrates. A hard coating having all of the aforementioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsesquioxane ($RSiO_{3/2}$). In the finished cured coating the ratio of $RSiO_{3/2}$ units to $SiO_2$ will range from about 0.43 to about 9.0, preferably 1 to 3. A cured coating having a ratio of $RSiO_{3/2}$ to $SiO_2$, where R is methyl, of 2 is most preferred. The coating thickness can be varied by means of the particular application technique, but coatings of about 0.5 to 20 microns, preferably 2–10 micron thickness are generally utilized.

In order that those skilled in the art may better understand how to practice the present invention, the following examples are given by way of illustration and not by way of limitation.

EXAMPLE 1

22.1 parts by weight of Ludox LS, silica sol (aqueous dispersion of colloidal silica, average particle size of 12 millimicrons, pH of 8.2, sold by duPont) is added to a solution of 0.1 parts by weight of methytriacetoxysilane in 26.8 parts by weight of methyltrimethoxysilane. The temperature of the reaction mixture is maintained at 20° C. to 30° C., preferably below 25° C. The hydrolysis is allowed to continue for 24 hours. The solids content of the resultant reaction mixture is 40.5% and is diluted to about 20% solids with the addition of isobutanol thereto. The pH of the product is about 7.2.

This composition is flow-coated onto a transparent Lexan ® (poly(bisphenol-A carbonate)) panel primed with a thermosetting acrylic emulsion. After air drying for 30 minutes the panel is cured for one hour at 120° C. After 500 Taber Abraser cycles (500 g. load, CS-10F wheels) (ANSI-Z26.1-1977 section 5.17) the change in percent haze ($\Delta\%H$) is 1.8. The sample passes the cross-hatched adhesion test (DIN-53-151) after 7 days in 65° C. water. It also passes the cross-hatched adhesion test (DIN-53-151) after 1000 hours under R-S Lamp exposure on a rotating platform 10" from the faces of an array of 6 lamps arranged at 120° from one another. The platform rotates at about 3 RPM.

EXAMPLE 2

300 grams of a 30% aqueous colloidal silica dispersion having an average particle size of 20 millimicrons and pH of 9.2 (prepared by dilution of Nalcoag 1050, a product of NALCO Chemical Company) is added to a solution of 0.9 grams glacial acetic acid and 366 grams of methyltrimethoxysilane. The temperature of the reaction mixture is maintained below 30° C. The hydrolysis is allowed to continue for 3 days. The solids content of the resultant reaction mixture is 40.5% and is diluted with 419 grams of isopropanol to a final dilution of 25% solids. The pH of the final composition is about 7.5.

This composition (containing 3% of a 3% solution of tetramethylammonium acetate) is flow-coated on a transparent Lexan ® panel primed with an ethanol-isobutanol solution containing 1.5 weight percent of gamma-aminopropyltriethoxysilane and 1.5 wt. % of a preformed reaction product of gamma-aminopropyltriethoxysilane and maleic anhydride as disclosed in copending U.S. application Ser. No. 901,543, filed on May 1, 1978 by Holub and Vaughn. After air drying for 30 minutes the panel is cured for 1 hour at 120° C. After 500 Taber Abraser cycles the change in percent haze ($\Delta\%H$) is 1.15.

EXAMPLE 3

17.9 grams of Ludox LS is added to a solution of 0.06 grams of glacial acetic acid in 27.2 grams of methyltrimethoxysilane. The temperature of the reaction mixture is maintained below 30° C. The hydrolysis is allowed to continue for 6 hours. The solids content is 41.6% and is diluted with 30 grams of isobutanol to a final solids content of 25%. The pH is about 7.2.

The composition (containing 3% of a 3% solution of tetramethylammonium acetate) is flow-coated on a transparent Lexan ® panel primed as in Example 2. After curing, the (Δ%H) of the panel is 1.6.

Obviously, other modifications and variations of the present invention are possible in the light of the above teachings. It is therefore to be understood that changes may be made in the particular embodiments described above which are within the full intended scope of the invention as defined in the appended claims.

I claim:

1. A solid substrate having at least one surface coated with an aqueous coating composition comprised of a dispersion of colloidal silica, having a particle size of from about 5 to about 150 millimicrons in diameter, in a lower aliphatic alcohol-water solution of the partial condensate of a silanol of the formula $RSi(OH)_3$, wherein R is selected from the group consisting of alkyl having from 1 to 3 carbon atoms and phenyl, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition having a pH of 7.1 to about 7.8.

2. An article as defined in claim 1 wherein the solid substrate is comprised of a synthetic organic polymer.

3. An article as defined in claim 1 wherein said solid substrate is a metal.

4. An article as defined in claim 1 wherein said solid substrate is a synthetic organic polymer having a metallized surface.

5. An article as defined in claim 2 wherein said polymer is a transparent polymer.

6. An article as defined in claim 5 wherein said polymer is a polycarbonate.

7. An article as defined in claim 6 wherein said polycarbonate is a poly(bisphenol-A carbonate).

8. An article as defined in claim 1 wherein the aqueous coating composition has been cured on said surface of said solid substrate.

9. An article as defined in claim 1 wherein the partial condensate is of $CH_3Si(OH)_3$ and the lower aliphatic alcohol is a mixture of methanol and isobutanol.

10. A solid substrate having at least one surface coated with an improved aqueous coating composition prepared by admixing an aqueous colloidal silica dispersion having a particle size of from about 5 to about 150 millimicrons in diameter with a solution of a partial condensate of a silanol of an alkyltriacetoxy silane in an alkyltrialkoxysilane, said alkyl groups having from 1 to 3 carbon atoms, at least 70 weight percent of the silanol being $CH_3Si(OH)_3$, maintaining the temperature of the admixture at from about 20° C. to about 30° C. for a sufficient time to reduce the reaction mixture to one liquid phase, maintaining the pH of the composition in the range of from about 7.1 to about 7.8, and adjusting the solids content of the reaction mixture to 10 to 50 weight percent solids content of the reaction mixture to 10 to 50 weight percent solids consisting essentially of 10 to 70 weight percent colloidal silica and 30 to 90 weight percent of the partial condensate by the addition of a lower aliphatic alcohol thereto.

11. A substrate as defined in claim 10 wherein said alkyltrialkoxysilane is methyl trimethoxysilane, said alkyl(triacetoxy)silane is methyl(triacetoxy)silane and said aliphatic alcohol is isobutanol.

12. A substrate as defined in claim 11 wherein said aqueous colloidal silica dispersion has a basic pH, an average particle size of about 12 millimicrons and an alkali control of about 0.10%.

* * * * *